United States Patent
Dreina

(10) Patent No.: US 9,434,266 B2
(45) Date of Patent: Sep. 6, 2016

(54) METHOD FOR MONITORING AND OPTIMISING THE OPERATION OF A CHARGING TERMINAL FOR AN ELECTRIC VEHICLE AND CHARGING TERMINAL FOR IMPLEMENTING SAID METHOD

(71) Applicant: SCHNEIDER ELECTRIC INDUSTRIES SAS, Rueil-Malmaison (FR)

(72) Inventor: Emmanuel Dreina, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 246 days.

(21) Appl. No.: 14/351,698

(22) PCT Filed: Dec. 14, 2012

(86) PCT No.: PCT/FR2012/052933
§ 371 (c)(1),
(2) Date: Apr. 14, 2014

(87) PCT Pub. No.: WO2013/093306
PCT Pub. Date: Jun. 27, 2013

(65) Prior Publication Data
US 2014/0312853 A1 Oct. 23, 2014

(30) Foreign Application Priority Data
Dec. 19, 2011 (FR) ...................................... 11 03924

(51) Int. Cl.
H02J 7/04 (2006.01)
H02J 7/16 (2006.01)
(Continued)

(52) U.S. Cl.
CPC .......... *B60L 11/1816* (2013.01); *B60L 3/0069* (2013.01); *B60L 11/1846* (2013.01);
(Continued)

(58) Field of Classification Search
USPC ........................................................ 320/145
See application file for complete search history.

(56) References Cited

U.S. PATENT DOCUMENTS

2010/0134067 A1\* 6/2010 Baxter .................. B60L 3/0084
320/109
2012/0112697 A1\* 5/2012 Heuer ................. B60L 11/1818
320/109

(Continued)

OTHER PUBLICATIONS

EV Charging Systems Committee "(R) SAE Eclectic Vehicle Conductive Charge Coupler", SAE International The Engineering Society for Advancing Mobility Land Sea Air and Space, vol. J1772, No. Rev. Nov. 2001, pp. 1-32, Oct. 1, 1996, XP002666503.
(Continued)

*Primary Examiner* — Bryce Aisaka
(74) *Attorney, Agent, or Firm* — Oblon, McClelland, Maier & Neustadt, L.L.P.

(57) ABSTRACT

A method for monitoring and optimizing operation of a terminal, including: generating an output voltage equal to a first DC value; connecting a vehicle, the output voltage switching to a second value; authorizing charging of the vehicle by modulating the output voltage between two values, with a maximum authorized charge current being set; checking an ability of the vehicle to be recharged by monitoring a value of the output voltage; supplying an output voltage modulated between a third voltage value and a negative value; initializing a first timer; reading a diagnosis time between initialization and the switching of the voltage from the second to the third value; comparing the time with standard values to determine a type of charger; taking characteristics of the charger into account to optimize energy management.

10 Claims, 5 Drawing Sheets

(51) Int. Cl.
*B60L 11/18* (2006.01)
*B60L 3/00* (2006.01)
*H02J 7/00* (2006.01)

(52) U.S. Cl.
CPC ........... *H02J 7/007* (2013.01); *B60L 2200/12* (2013.01); *B60L 2230/12* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2012/0139489 A1* | 6/2012 | Gaul | .................... | B60L 11/1816 320/109 |
| 2012/0187905 A1* | 7/2012 | Kanayama | ............... | H04B 3/54 320/109 |
| 2013/0110296 A1* | 5/2013 | Khoo | .................. | B60L 11/1825 700/286 |

OTHER PUBLICATIONS

International Search Report Issued Feb. 6, 2013, in PCT/FR12/052933 Filed Dec. 14, 2012.

* cited by examiner

METHOD FOR MONITORING AND OPTIMISING THE OPERATION OF A CHARGING TERMINAL FOR AN ELECTRIC VEHICLE AND CHARGING TERMINAL FOR IMPLEMENTING SAID METHOD

BACKGROUND OF THE INVENTION

The invention relates to a method for monitoring and optimising the operation of a charging terminal of an electric vehicle, said terminal comprising connection means designed to be connected to a vehicle for electric charging and to dialogue by means of a signal transmitted via a pilot wire. The method consists in:
- generating an "output" voltage equal to a first DC voltage value;
- connecting an electric vehicle to the charging terminal, the "output" voltage switching from the first DC voltage value to a second DC voltage value;
- checking the charging ability of said terminal;
- authorising charging of the electric vehicle by modulating the "output" voltage between a positive value equal to the second voltage value and a negative value equal to the opposite of the first voltage value, the modulation of PWM type having a duty ratio fixed according to a maximum authorised charge current;
- checking the ability of the electric vehicle to be recharged by monitoring a positive value of the modulated "output" voltage, said positive value of the "output" voltage switching from the second voltage value to a third voltage value when said vehicle is able to be recharged;
- supplying a voltage called "charge" voltage to said vehicle by modulating the "output" voltage between a positive value equal to the third voltage value and a negative value equal to the opposite of the first voltage value, the duty ratio of the modulation enabling the maximum charge current to be set to a first value.

The invention also relates to an electric charging terminal for implementation of the method for monitoring and optimising according to the invention. Said terminal comprises connection means designed to be connected to a vehicle for electric charging and to dialogue by means of a signal transmitted via a pilot wire. The terminal also comprises means for generating a DC or modulated "output" voltage and a voltage called "charge" voltage to said vehicle by modulating the "output" voltage between a positive value and a negative value, the duty ratio of the modulation enabling the maximum charge current to be set to a first value. Processing means comprise means for checking the ability of said terminal to perform charging, to check the ability of the electric vehicle to be recharged by monitoring a positive value of the modulated "output" voltage and to authorise charging of the electric vehicle.

STATE OF THE PRIOR ART

Charging terminals for electric vehicles installed in collective car parks are of two types. A first type concerns charging terminals called "fast" charging terminals. The voltages applied by this type of terminal are DC voltages. The other types of terminals deliver AC voltages.

At present, existing standards do not enable a charging terminal to identify the type of vehicle that is connected to it. The standards (SAE J1772 and IEC 61851) do not in fact enable the charging terminal to retrieve information on the characteristics of the charger. Communication between the electric vehicle and the charging terminal is limited to security communication. That is to say that the only information exchanged in particular enables the ground continuity between the vehicle and the terminal to be checked and/or enables the terminal to fix the maximum current consumable by the vehicle and/or the state in which the vehicle is (connected, ready to charge, and of charging) to be known.

In the case of a car park with several charging terminals, knowing the type of vehicle connected to a charging terminal would enable energy management to be optimised at the level of the car park.

This knowledge would in fact enable energy management to be optimised at the level of a car parking area on which several charging terminals are located. By default, the car park energy manager will reserve 16 A or 32 A for each terminal. This has a cost: high subscribed energy, inability to supply the last free charging terminals of the car park. Knowing the maximum energy consumed by a charger depending on the electric vehicle on charge would enable the amps that are not used to be used to supply other charging terminals.

SUMMARY OF THE INVENTION

The object of the invention is therefore to remedy the drawbacks of the state of the art so as to propose a method for monitoring and optimising the operation of a charging terminal for an electric vehicle, a method based on knowledge of the vehicle connected to the terminal.

The method according to a main embodiment of the invention consists in:
- initialising a first timer concomitantly with authorisation of charging of the vehicle;
- reading a first elapsed diagnosis time between initialisation of the first timer and switching of the "output" voltage from the second voltage value to a third voltage value;
- comparing the value of the first diagnosis time with "standard" values recorded in a database;
- determining a type of charger of the electric vehicle according to a comparative state between said first diagnosis time and the "standard" values;
- taking the characteristics of the charger of the identified electric vehicle into account to locally optimise energy management.

The first DC voltage value is preferably higher than the second DC voltage value.

The second voltage value is preferably higher than the third voltage value.

According to a first upgradable embodiment, the monitoring method consists in:
- initialising a second timer concomitantly with supply of the voltage called "charging voltage" to said vehicle;
- detecting the time when a charge current consumed by the vehicle reaches a maximum value;
- reading a second elapsed diagnosis time for the charge current to reach a maximum value;
- comparing the value of the second diagnosis time with values recorded in a database taking account of the comparative state relative to the value of the first diagnosis time;
- determining a type of charger of the electric vehicle according to said first and second diagnosis times;
- taking the characteristics of the charger of the identified electric vehicle into account to locally optimise energy management.

According to a second upgradable embodiment, the monitoring method consists in:

- concomitantly initialising a third timer and setting the maximum charge current to a second charging value, the "output" voltage being modulated between a positive value equal to the third voltage value and a negative value equal to the opposite of the first voltage value;
- checking that the vehicle regulates its current according to the second maximum charging value;
- reading a third diagnosis time at the moment when the electric vehicle regulates its charge current to the second maximum charging value;
- comparing the value of the third diagnosis time with the values according to a database taking account of the comparative state relative to the value of the first diagnosis time and the comparative state relative to the value of the second diagnosis time;
- determining a type of charger of the electric vehicle according to said first, second and third times;
- taking the characteristics of the charger of the identified electric vehicle into account to locally optimise energy management.

Preferably, the step of taking into account consists in adjusting a maximum charge current setpoint value according to the type of charger connected.

According to a particular embodiment, the step of taking into account consists in adjusting a maximum charge current setpoint value according to a maximum current consumable by the identified connected charger.

Advantageously, the step of taking into account consists in adjusting a maximum electric power delivered by said terminal according to a global operation of the charging station comprising several charging terminals.

According to a particular embodiment, the method for monitoring and optimising consists in:

- measuring the difference of electric current between the maximum current consumable by the identified connected charger and the maximum charge current $I_{max}$ authorised by the terminal;
- placing the measured electric current difference at the disposal of another charging terminal of the charging station.

The processing means of the electric charging terminal according to the invention comprise means for:

- initialising a first timer concomitantly with authorisation of charging of the vehicle;
- reading a first elapsed diagnosis time between initialisation of the first timer and switching of the "output" voltage from a second voltage value to a third voltage value;
- comparing the value of the first diagnosis time with "standard" values recorded in a database;
- determining a type of charger of the electric vehicle according to a comparative state between said first diagnosis time and the "standard" values;
- taking the characteristics of the charger of the identified electric vehicle into account to locally optimise energy management.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION OF AN EMBODIMENT

Figure 1:
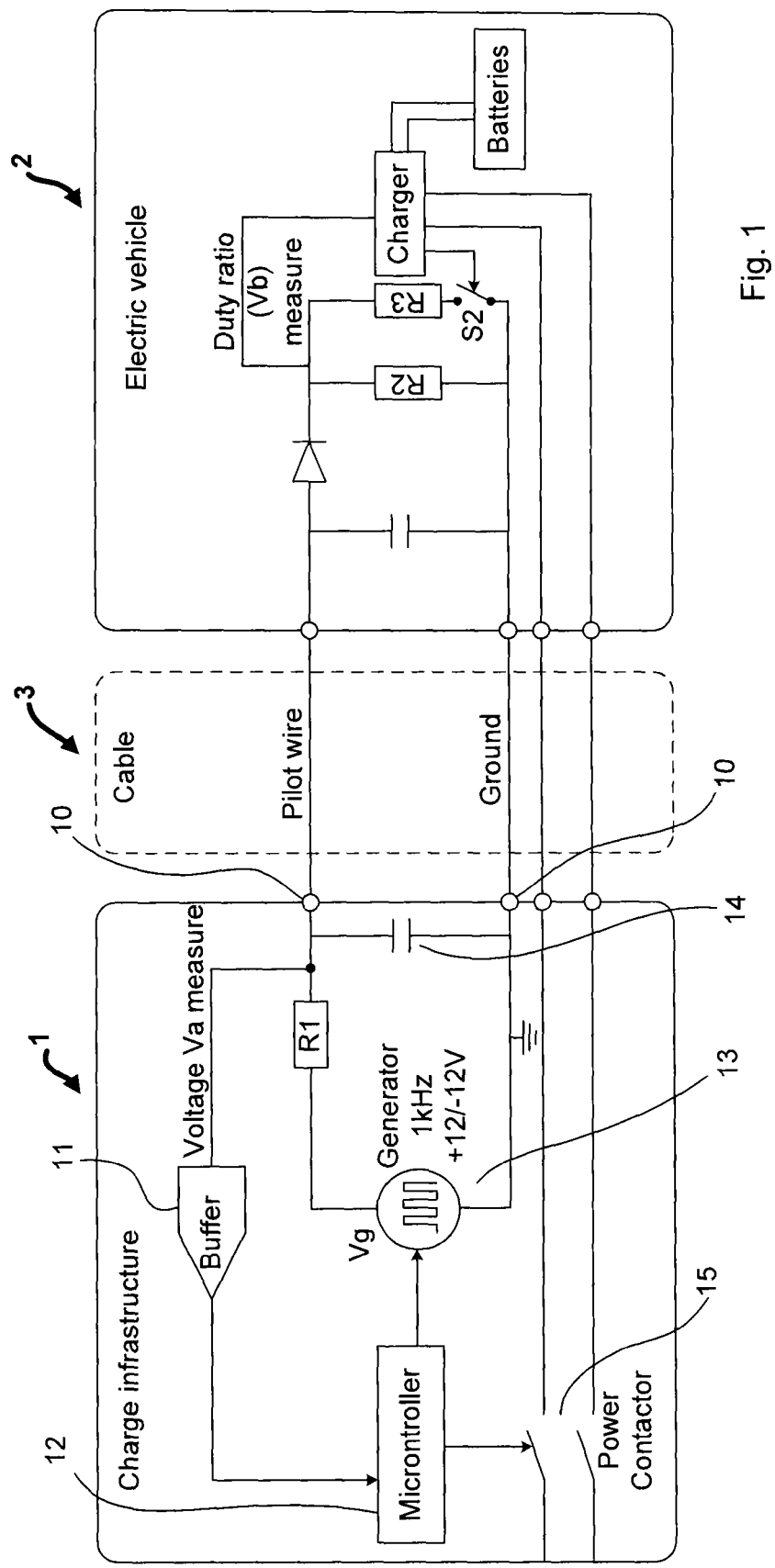
FIG. 1 represents a wiring diagram of the control circuitry of an electric terminal and an electric vehicle, the terminal being connected to the vehicle.

As represented in FIG. 1, said terminal 1 according to the invention comprises connection means 10 designed to be connected to a vehicle 2 for electric charging. In known manner, the terminal is designed to be connected to a vehicle by a cable 3 able to transmit electric power. Cable 3 also comprises dialogue means by means of a signal transmitted on a pilot wire. Terminal 1 further comprises a processing unit 12 preferably controlled by a microcontroller. Charging terminal 1 also comprises filtering capacitances 14 connected in parallel to the connection means 10. Means 11 for measuring the voltage at the level of the connection means are connected to the processing unit 12 which is able to send control signals to a signal generator 13.

As an application example, the signal generator 13 generates an "output" voltage at the level of the connection means 10. The "output" voltage can be a DC voltage or a pulse width modulated voltage. Modulation is then of PWM type. The duty ratio of the pulse width modulation (PWM) then enables the maximum charge current $I_{max}$ that the electric vehicle 2 will be able to consume to be set. For example purposes, the output voltage signal is modulated at a frequency of 1 KHz and has an amplitude varying between +12V and −12V.

Figure 3:
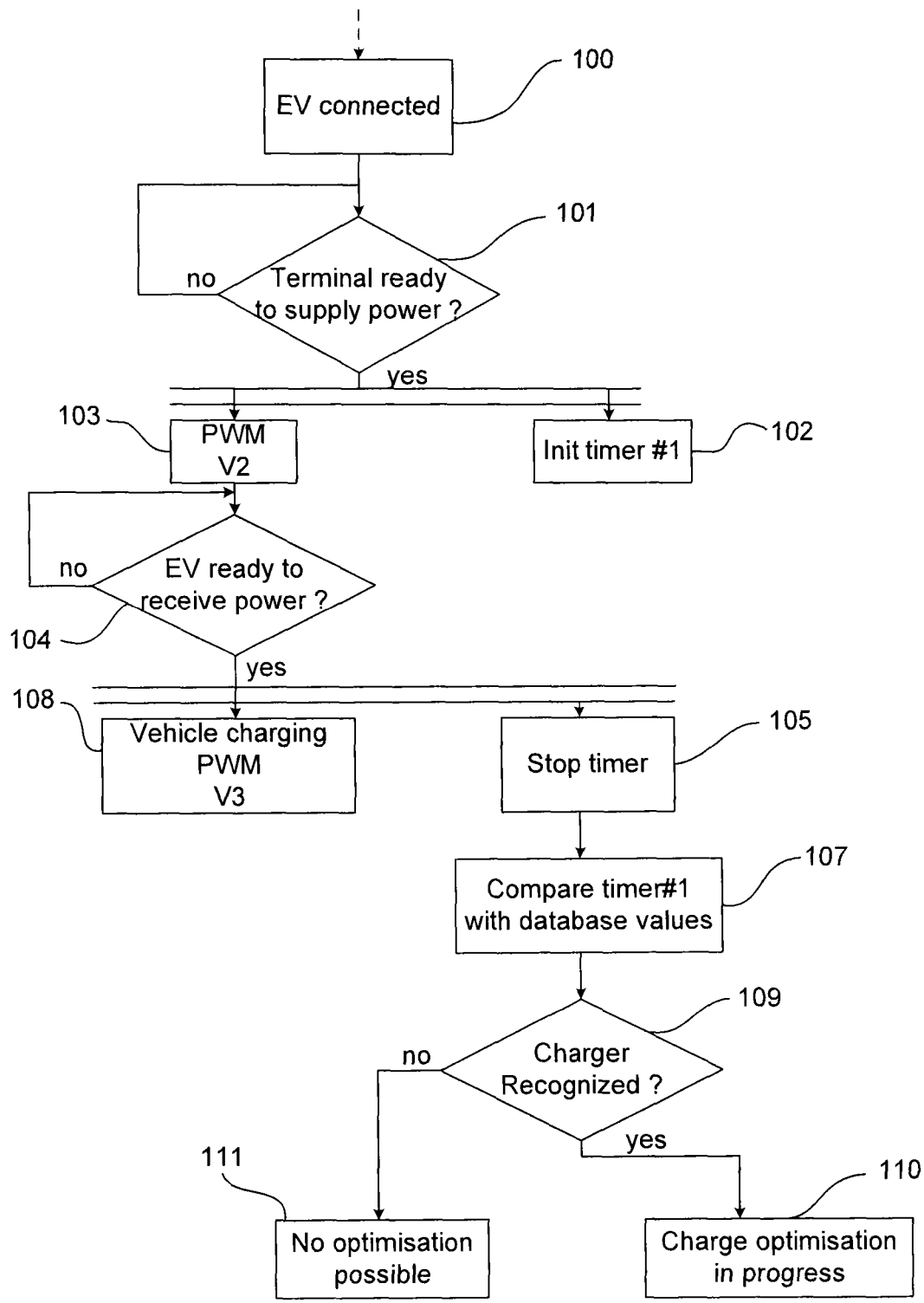
FIG. 3 represents an algorithm of the steps of a method for monitoring and optimising the charging phase of an electric vehicle according to an embodiment of the invention.

As represented in FIG. 3, the method for monitoring and optimising the operation of a charging terminal 1 according to the invention consists in generating a DC "output" voltage equal to a first voltage value V1. As an example of an application, the first voltage value V1 is equal to 12 Volts.

The next step of the method according to the invention consists in connecting 100 an electric vehicle 2 to the charging terminal 1. The DC "output" voltage measured by the measuring means 11 of the terminal 1 is equal to a second voltage value V2. This switching from the first voltage value V1 to the second voltage value V2 is linked to the value of a first charging resistor R2 of the electric vehicle seen from the connection means 10 of the terminal 1. According to this embodiment of the invention, the first voltage value V1 is higher than the second voltage value V2. For example purposes, the second voltage value V2 is equal to 9 volts. This change of voltage measured by the terminal thus informs the latter that a vehicle is connected.

The next step consists in checking 101 the ability of said terminal to perform charging. The method according to the invention remains at this step so long as the conditions required for starting charging are not fulfilled. These conditions for starting charging are not for example fulfilled when there is not sufficient energy available at the level of the charging terminal. Furthermore, the conditions are not fulfilled when for example the user is not correctly identified or when securing of the connection between the cable and the charging terminal is not effective. This step is therefore of indeterminate duration.

Figure 2:
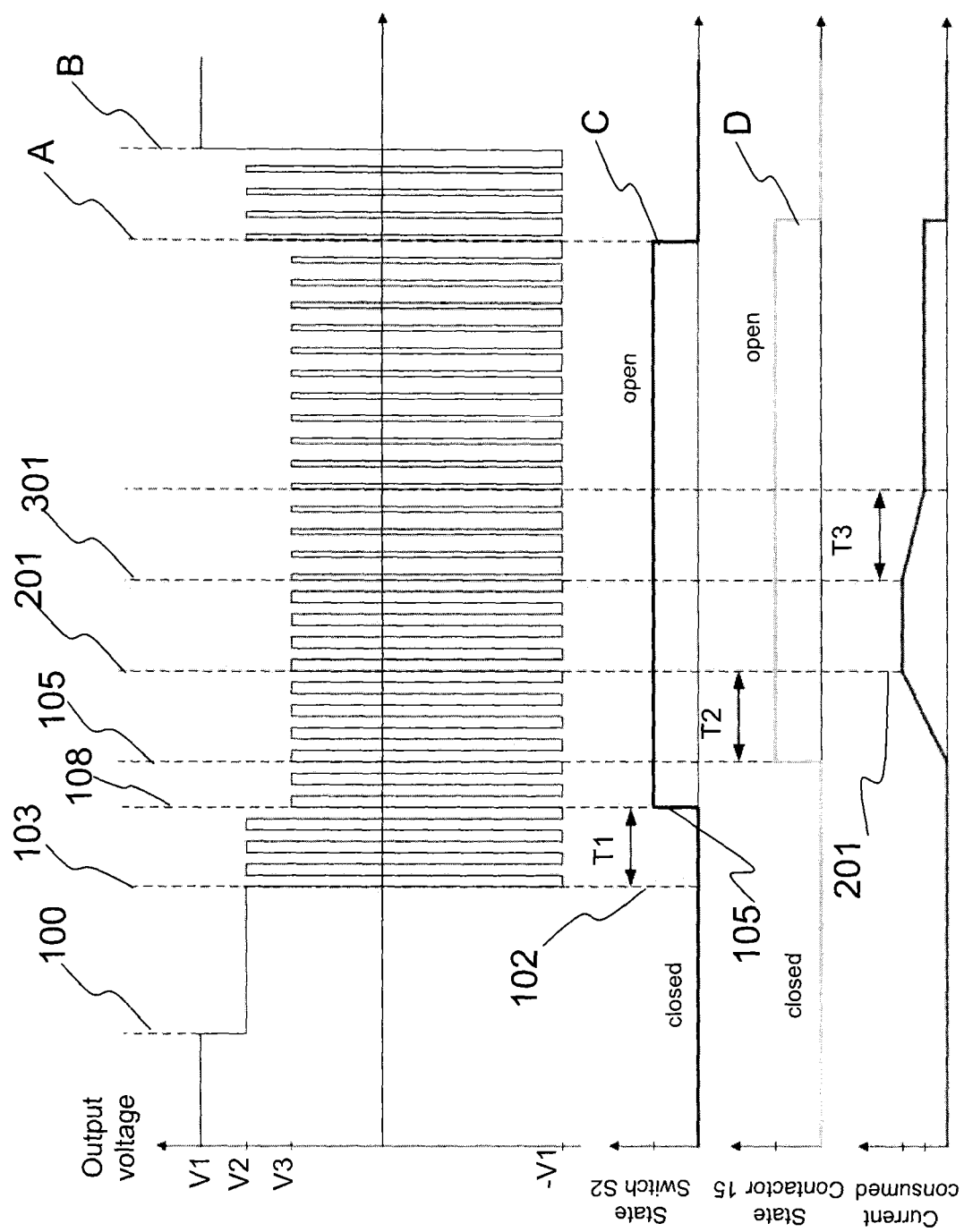
FIG. 2 represents a timing diagram of the different monitoring and charging phases.

As represented in FIGS. 2 and 3, the method according to the invention consists in authorising 103 charging of the electric vehicle by modulating the "output" voltage between a positive value equal to the second voltage value V2 and a negative value equal to the opposite of the first voltage value −V1. The modulation of PWM type then has a duty ratio that is fixed according to the maximum charge current $I_{max}$ authorised by the terminal.

The next step consists in checking 104 the ability of the electric vehicle 2 to be recharged by monitoring a positive value of the modulated "output" voltage. The electric vehicle is deemed to be able to be recharged by the charging terminal 1 if the modulated "output" voltage measured by the measuring means 11 of the terminal is equal to a third voltage value V3. In other words, said positive value of the "output" voltage switches from the second voltage value V2 to a third voltage value V3 when said vehicle is able to be recharged. During this step, the electric vehicle then analyses the modulated output voltage signal and adjusts its charger according to the maximum authorised current $I_{max}$. The electric vehicle traditionally comprises a charging circuit connected to the connection means 10 of the charging terminal 1. Once the charger has been adjusted, the vehicle is ready to be charged and indicates this to the charging terminal 1 by changing its resistance seen by said terminal at the level of the connection means 10. This change of output voltage from the second voltage value V2 to the third voltage value V3 is then linked to connection of a second charging resistor R3 via commutation of a switch S2 in the charge circuit of the electric vehicle 2. As represented in FIG. 1, the second charging resistor R3 is connected in parallel with the first charging resistor R2. According to this embodiment of the invention, the second voltage value V2 is higher than the third voltage value V2. For example purposes the third voltage value V3 is equal to 6 volts.

When the vehicle is able to be recharged, the method supplies 108 a voltage called "charge voltage" to said vehicle by closing a power contactor 15 by modulating the "output" voltage between a positive value equal to the third voltage value V3 and a negative value equal to the opposite of the first voltage value −V1. The duty ratio of the modulation enables a first maximum charge current threshold $I_{max1}$ to be set.

Depending on the model and make of the electric vehicle, the charger carried on-board the vehicle does in fact have different properties. One of the interesting properties for energy management is the maximum current that this charger is able to consume considering that said chargers do not all consume the same maximum current. For example purposes, a first type of charger does not consume more than 13 A whereas a second type consumes a maximum of 15 A. The difference of maximum current can be much higher with lighter electric vehicles such as scooters and the next vehicle generations which should be able to consume around 32 A. According to a preferred embodiment, the method according to the invention is able to discriminate the type of charger connected to a charging terminal to adjust the maximum authorised charge current in customised manner thereby optimising charging of other electric vehicles connected to the charging station.

According to a main embodiment of the invention as represented in FIG. 3, the method then consists in performing an initialisation step 102 of a first timer, timer #1, concomitantly with the vehicle charging authorisation step 103 described in the foregoing.

The method then consists in reading 105 a first elapsed diagnosis time T1 between initialisation 102 of the first timer #1 and switching of the "output" voltage from the second voltage value V2 to a third voltage value V3. The value of the first diagnosis time T1 is then compared 107 with "standard" values recorded in a database. The comparative state between said first diagnosis time T1 and the "standard" values enables a type of charger of the electric vehicle 2 connected to the charging terminal 1 to be determined 109. The type of charger being known, the processing unit 12 of the charging terminal 1 takes the characteristics of said identified charger into account 110 to locally optimise energy management.

According to a particular embodiment, the step of taking into account 110 described above consists in adjusting a charge current setpoint value according to the type of charger connected. According to a variant, said step of taking into account 110 consists in adjusting an electric power delivered by said terminal according to a global operation of a charging station comprising several terminals. The power available in the charging station is in fact very often lower than the sum of the powers of the terminals of this station. Therefore, in order to optimise the charging service, the maximum power authorised for charging an electric vehicle has to be adjusted according to the characteristics of the respective chargers of said vehicles.

Figure 4:
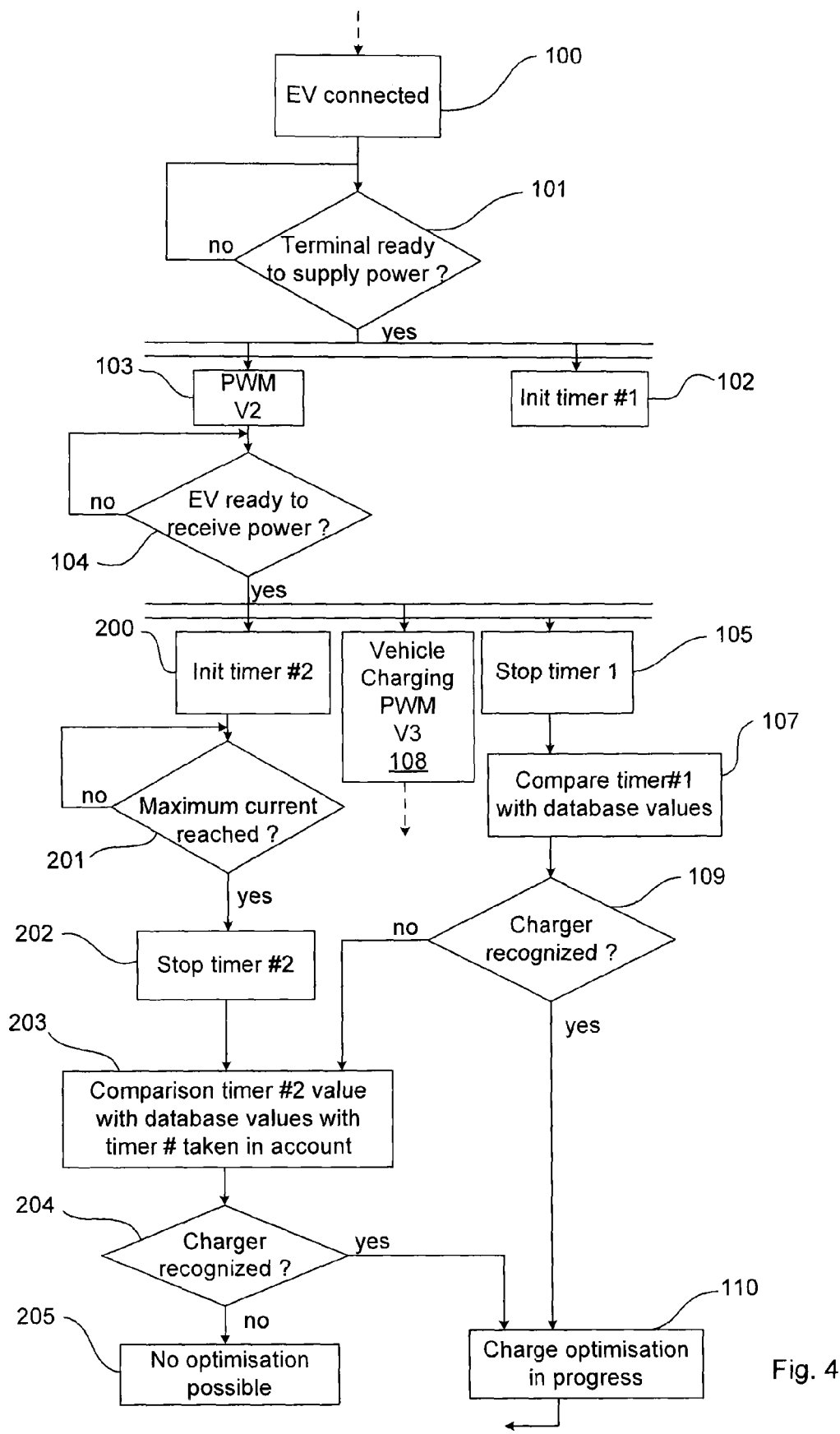
FIG. 4 represents an algorithm of the steps of the method for monitoring and optimising according to a first particular embodiment of the invention according to FIG. 3.

According to a first upgradable embodiment of the invention as represented in FIG. 4, the method for monitoring and optimising enables the quality of identification of the type of charger to be enhanced. Indeed, if the comparison 107 between the value of the first diagnosis time T1 and the "standard" values does not enable the type of electric charger to be determined with certainty, then the first upgradable mode enables the charger type discrimination criteria to be further refined.

The method then consists in initialising 200 a second timer, timer #2, concomitantly with supply 108 of the voltage called "charge voltage" to said vehicle. The next step consists in detecting 201 the time when a charge current consumed by the electric vehicle 2 reaches a maximum value. A second elapsed diagnosis time T2 for the charge current to reach a maximum value is recorded 202.

The value of the second diagnosis time T2 is then compared 203 with values recorded in a database.

This comparison is made taking account of the comparative state related to the first diagnosis time T1.

The latter comparison enables a type of charger of the electric vehicle to be determined 204 according to said first and second diagnosis times T1, T2.

The type of charger being known, the processing unit 12 of the charging terminal 1 is able to take the characteristics of said identified charger into account 110 to locally optimise energy management.

Figure 5:
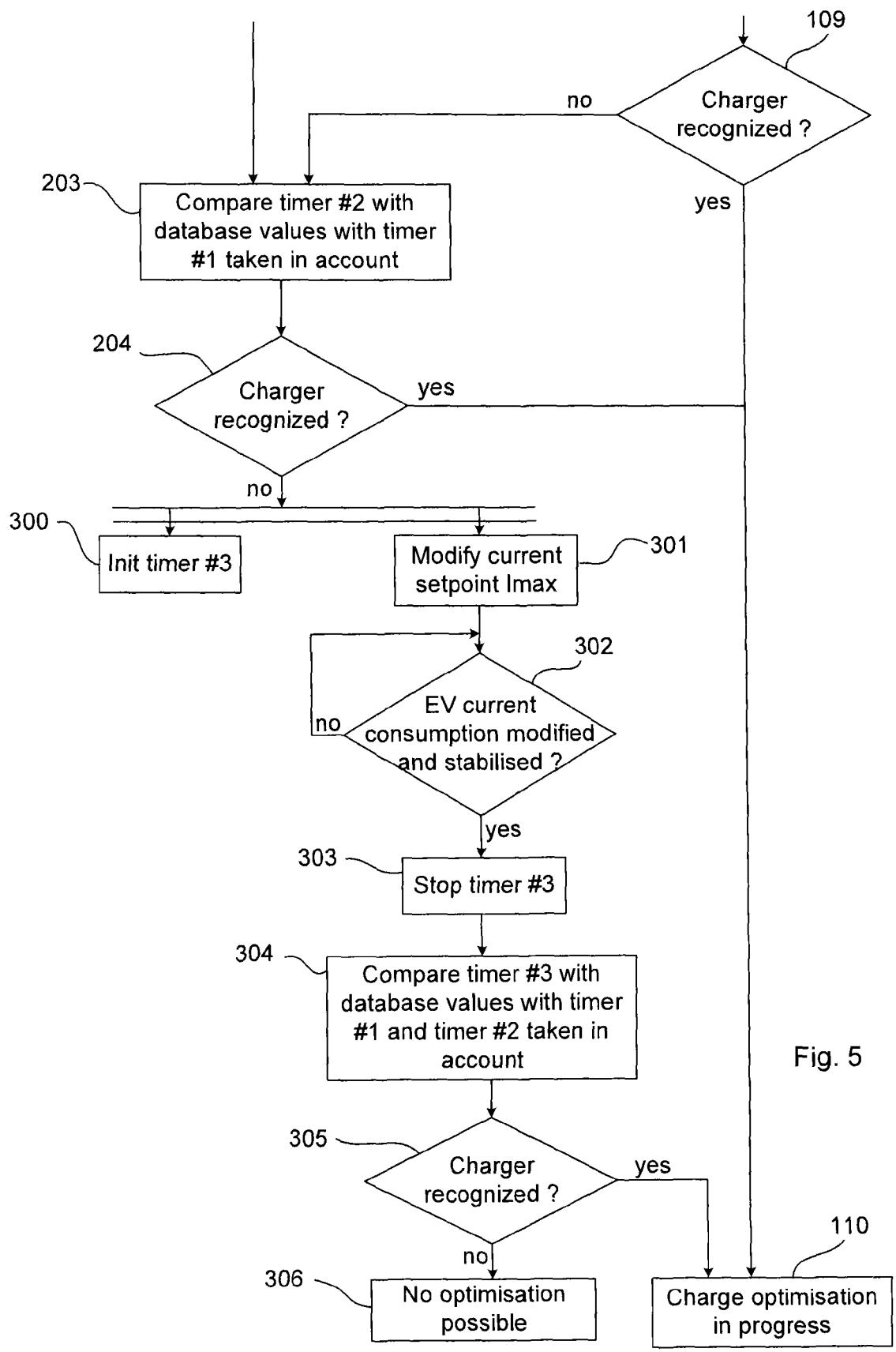
FIG. 5 represents an algorithm of the steps of the method for monitoring and optimising according to a second particular embodiment of the invention according to FIG. 4.

According to a second upgradable embodiment of the invention as represented in FIG. 5, the method for monitoring and optimising enables the quality of identification of the type of charger to be enhanced. Indeed, if the first upgradable mode is not sufficient to determine the type of electric charger with certainty, the second upgradable mode then enables the charger type discrimination criteria to be further refined.

The method then consists in concomitantly performing initialisation 300 of a third timer, timer #3, and in setting 301 the charge current to a second maximum charge value $I_{max2}$. The duty ratio of the modulation enables the charge current to be set to the second maximum charge value $I_{max2}$. The "output" voltage is modulated between a positive value equal to the third voltage value V3 and a negative value equal to the opposite of the first voltage value −V1.

The method checks 302 that the electric vehicle 2 regulates its charge current according to the second maximum charge value $I_{max2}$. As represented in FIG. 2, a third diagnosis time T3 is read 303 as soon as the vehicle reaches a maximum charge current linked to the setpoint $I_{max2}$.

The value of the third diagnosis time T3 is then compared 304 with values recorded in a database. This comparison is made taking account of both the comparative state linked to the first diagnosis time T1 and the comparative state linked to the second diagnosis time T2.

The latter comparison enables a type of charger of the electric vehicle to be determined 305 according to said first, second and third times T1, T2, T3.

The type of charger being known, the processing unit 12 of the charging terminal 1 is able to take the characteristics of said identified charger into account 110 to locally optimise energy management in the charging station.

When the charger detects that the vehicle batteries are totally charged, or when the user interrupts charging, the charger opens the contact S2 (point C in FIG. 2). This has the consequence of disconnecting the charging resistor R3 of the pilot wire and therefore causes a transition (point A in FIG. 2) of the PWM signal from the third voltage value V3 to the second voltage value V2. When the charging terminal detects transition of the pilot wire voltage from the third value to the second voltage value (V3 to V2), it opens the power contactor 15 (point D in FIG. 2).

So long as the electric vehicle remains connected to the terminal, the modulated signal of PWM type on the pilot wire remains modulated at the level of the second voltage value V2. When the electric vehicle is disconnected, this causes a transition of the voltage of the PWM signal from the second voltage value V2 to the first voltage value V1 (point B in FIG. 2). As soon as the first voltage value V1 is measured, the charging terminal stops modulation of the voltage signal.

The invention claimed is:

1. A method for monitoring and optimizing operation of a charging terminal of an electric vehicle, the terminal including connection means configured to be connected to an electric vehicle for electric charging, the method comprising:
    generating an output voltage equal to a first direct current (DC) voltage value;
    connecting the electric vehicle to the charging terminal, the output voltage switching from the first DC voltage value to a second DC voltage value;
    checking an ability of the charging terminal to perform charging;
    authorizing charging of the electric vehicle by modulating the output voltage between a positive value equal to the second voltage value and a negative value equal to opposite of the first voltage value, the modulation is of pulse width modulation (PWM) type having a duty ratio fixed according to a maximum authorized charge current;
    checking an ability of the electric vehicle to be recharged by monitoring a positive value of the modulated output voltage, the positive value of the output voltage switching from the second voltage value to a third voltage value when the vehicle is able to be recharged;
    supplying a charge voltage to the electric vehicle by modulating the output voltage between a positive value equal to the third voltage value and the negative value equal to the opposite of the first voltage value, the duty ratio of the modulation enabling the maximum authorized charge current to be set to a first value;
    initializing a first timer concomitantly with authorization of charging of the electric vehicle, the first timer starting at a time the modulating the output voltage between the positive value equal to the second voltage value and the negative value equal to the opposite of the first voltage value starts;
    reading a first elapsed diagnosis time between:
        initialization of the first timer, and
        switching of the output voltage from the second voltage value to the third voltage value;
    comparing a value of the first elapsed diagnosis time with standard values recorded in a database;
    determining a type of charger of the electric vehicle according to a comparative state between the first elapsed diagnosis time and the standard values; and
    taking characteristics of the charger of the identified electric vehicle into account to locally optimize energy management.

2. The method for monitoring and optimizing according to claim 1, wherein the first DC voltage value is higher than the second DC voltage value.

3. The method for monitoring and optimizing according to claim 1, wherein the second voltage value is higher than the third voltage value.

4. The method for monitoring and optimizing according to claim 1, further comprising:
    initializing a second timer concomitantly with supply of the charging voltage to the electric vehicle;
    detecting a time when a charge current consumed by the electric vehicle reaches a maximum value;
    reading a second elapsed diagnosis time for the charge current to reach the maximum value;
    comparing a value of the second diagnosis time with values recorded in a database taking account of a comparative state relative to the value of the first diagnosis time;
    determining a type of charger of the electric vehicle according to the first and second diagnosis times;
    taking characteristics of the charger of the identified electric vehicle into account to locally optimize energy management.

5. The method for monitoring and optimizing according to claim 4, further comprising:
    concomitantly:
        initializing a third timer;
        setting a maximum charge current to a second charge value, the output voltage being modulated between a positive value equal to the third voltage value and a negative value equal to the opposite of the first voltage value;
    checking that the vehicle regulates its current according to the second maximum charge value;
    reading a third diagnosis time at a moment when the electric vehicle regulates its charge current to the second maximum charge value;
    comparing a value of the third diagnosis time with values recorded in a database taking account:
        of a comparative state of the value of the first diagnosis time;
        of a comparative state of the value of the second diagnosis time;
    determining a type of charger of the electric vehicle according to the first, second, and third times;

taking the characteristics of the charger of the identified electric vehicle into account to locally optimize energy management.

6. The method for monitoring and optimizing according to claim 1, wherein the taking into account includes adjusting a maximum charge current setpoint value according to the type of charger connected.

7. The method for monitoring and optimizing according to claim 6, wherein the taking into account includes adjusting a maximum charge current setpoint value according to a maximum current consumable by the identified connected charger.

8. The method for monitoring and optimizing according to claim 6, wherein the taking into account includes adjusting a maximum electric power delivered by the terminal according to a global operation of a charging station including plural charging terminals.

9. The method for monitoring and optimizing according to claim 8, further comprising:
  measuring a difference of electric current between the maximum current consumable by the identified connected charger and the maximum charge current authorized by the terminal;
  placing the measured electric current difference at disposal of another charging terminal of the charging station.

10. An electric charging terminal, comprising:
  a connector configured to be connected to an electric vehicle for electric charging;
  a generator configured to generate an output voltage equal to a first direct current (DC) voltage value, the output voltage switching from the first DC voltage value to a second DC voltage value; and
  a processing circuitry configured to:
    check ability of the electric charging terminal to perform charging;
    authorize charging of the electric vehicle by modulating the output voltage between a positive value equal to the second voltage value and a negative value equal to opposite of the first voltage value, the modulation is of pulse width modulation (PWM) type having a duty ratio fixed according to a maximum authorized charge current;
  check ability of the electric vehicle to be recharged by monitoring a positive value of the modulated output voltage, the positive value of the output voltage switching from the second voltage value to a third voltage value when the vehicle is able to be recharged;
    supply a charge voltage to the electric vehicle by modulating the output voltage between a positive value equal to the third voltage value and the negative value equal to the opposite of the first voltage value, the duty ratio of the modulation enabling the maximum authorized charge current to be set to a first value;
  initialize a first timer concomitantly with authorization of charging of the electric vehicle, the first timer starting at a time the modulating the output voltage between the positive value equal to the second voltage value and the negative value equal to the opposite of the first voltage value starts;
  read a first elapsed diagnosis time between:
    initialization of the first timer, and
    switching of the output voltage from the second voltage value to the third voltage value;
  compare a value of the first elapsed diagnosis time with standard values recorded in a database;
  determine a type of charger of the electric vehicle according to a comparative state between the first elapsed diagnosis time and the standard values; and
  take characteristics of the charger of the identified electric vehicle into account to locally optimize energy management.

* * * * *